United States Patent [19]

Romano et al.

[11] Patent Number: 5,304,755
[45] Date of Patent: Apr. 19, 1994

[54] RETAINER FOR MECHANISM OPERATED CELL SWITCH IN METAL-CLAD SWITCH GEAR

[75] Inventors: Joseph V. Romano, Center Township; Beaver County; Ronald E. Vaill, Penn Township, Westmoreland County, both of Pa.

[73] Assignee: Westinghouse Electric Corp., Pittsburgh, Pa.

[21] Appl. No.: 983,487

[22] Filed: Nov. 30, 1992

[51] Int. Cl.⁵ .......................................... H01H 33/48
[52] U.S. Cl. .......................... 200/50 AA; 200/50 A
[58] Field of Search ............ 200/50 R, 50 A, 50 AA, 200/144 R, 144 B, 145, 148 R, 148 D, 148 F, 150 J, 150 JA, 150 L; 361/334–339, 343, 341, 605, 606, 607, 608, 609, 610, 621

[56] References Cited

U.S. PATENT DOCUMENTS 3,437,768  4/1969  Miller et al. ................. 200/500 AA
4,176,262  11/1979  McMillen et al. ............ 200/50 AA Primary Examiner—A. D. Pellinen
Assistant Examiner—Michael A. Friedhofer
Attorney, Agent, or Firm—M. J. Moran

[57] ABSTRACT

An elongated retainer member pivotally mounted on the auxiliary contact operating mechanism of a drawout circuit breaker maintains a positive connection for the mechanism with the channel assembly of the motion transfer assembly which actuates auxiliary contacts mounted on the cabinet wall of metal-clad switch gear.

14 Claims, 3 Drawing Sheets

RETAINER FOR MECHANISM OPERATED CELL SWITCH IN METAL-CLAD SWITCH GEAR

BACKGROUND OF INVENTION

Field of the Invention

This invention relates generally to mechanisms interconnecting auxiliary contacts with a drawout circuit breaker in metal clad switch gear. More particularly, it relates to such switch gear and apparatus for retaining the interconnection between the auxiliary contacts and the main circuit breaker during operation of the circuit breaker.

Background Information

Metal clad switch gear refers to circuit breakers which are removably contained within metal cabinets. The circuit breaker is levered, or otherwise maneuvered, into the cabinet on rollers to engage terminals in the back of the cabinet which connect the circuit breaker to the circuit to be protected and to the line.

It is common to provide auxiliary contacts which open or close in correspondence with the operation of the circuit breaker for control or monitoring purposes. Where these auxiliary contacts are mounted to the cabinet rather than being incorporated in the circuit breaker, a mechanism must be provided for interconnecting the circuit breaker with the auxiliary contacts. This interconnection must accommodate for drawout and replacement of the circuit breaker, and in some installations, for selective actuation with the circuit breaker in an intermediate, test position.

Commonly owned U.S. Pat. No. 4,176,262 discloses such a mechanism for interconnecting the auxiliary contacts with a drawout circuit breaker in metal clad switch gear. This mechanism includes a channel which is maintained in a generally horizontal orientation by a pantograph arrangement as the channel member is raised and lowered by movement of a pin on the side of the breaker. This pin engages the channel member as the circuit breaker is levered into the cabinet and moves through a vertical arc with operation of the circuit breaker. The raising and lowering of the channel member by vertical movement of the pin on the circuit breaker actuates the auxiliary contacts.

The mechanism of the '262 patent was designed for use with air-magnetic circuit breakers. Such drawout circuit breakers are now being replaced by vacuum circuit breakers also having a pin extending laterally from the breaker which engages the channel in the interconnecting mechanism and moves through a vertical arc. However, the vacuum circuit breaker operates more rapidly than the air-magnetic circuit breaker which it replaces. It has been found that there is difficulty in retaining the auxiliary switch operating member on the vacuum circuit breaker in the channel of the interconnection.

There is a need therefore for improved metal clad switch gear, and in particular, metal clad switch gear incorporating vacuum interrupters. There is a specific need for improved apparatus for interconnecting the faster vacuum interrupters with the auxiliary contacts mounted in the cabinet of metal clad switch gear.

SUMMARY OF THE INVENTION

These needs and others are satisfied by the invention which is directed to metal-clad switch gear incorporating a retainer which maintains the auxiliary contact operating device on the circuit breaker in the channel in the motion transfer means interconnecting the auxiliary contact operating member on the circuit breaker with an auxiliary contact actuating member. This retainer is in the form of an elongated member which is carried by the auxiliary contact operating member on the circuit breaker and engages and extends along the channel of the interconnection when the circuit breaker is moved into position within the cabinet.

This elongated retainer member is pivotally mounted to the auxiliary contact operating member on the circuit breaker adjacent one end so that the elongated member hangs down vertically when the circuit breaker is withdrawn from the cabinet. As the circuit breaker is moved into the cabinet, the elongated retainer member is engaged by, and is pivoted into alignment with, the channel. The lead end of the elongated retainer member is contoured to guide it into the channel.

In the preferred form of the invention, the auxiliary contact operating member on the circuit breaker includes a shaft extending from the side of the circuit breaker, a lever arm connected to and rotated by the shaft, and a follower roller rotatably mounted on a pin near the free end of the lever arm. The elongated retainer member is pivotally mounted at one end on the pin and has a reduced thickness at that end forming a recess in which the follower roller is received. The follower roller has a diameter greater than the width of the elongated retainer member and extends axially beyond the elongated retainer member so that the follower roller engages and drives the channel. The elongated retainer member preferably includes a base portion which adds mass to the retainer member sufficient to slow down the operation of the interconnection.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
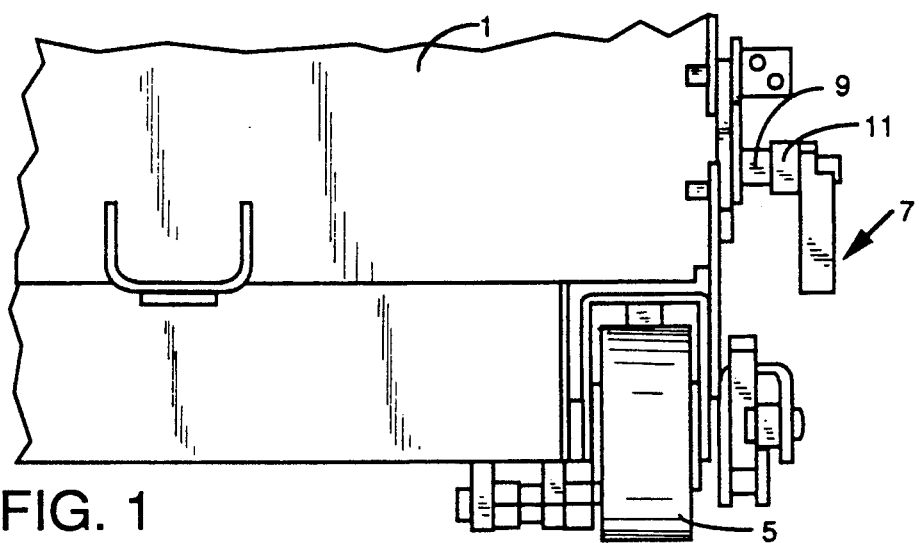
FIG. 1 is a front view of a portion of a drawout circuit breaker to which the invention has been applied.

The invention is particularly adapted for use with the metal clad switch gear of the type described in U.S. Pat. No. 4,176,262 which is hereby incorporated by reference. Referring to the drawings, such metal clad switch gear includes a drawout circuit breaker 1 which can be rolled in and out of a metal cabinet 3 on rollers 5. The circuit breaker 3 in the preferred metal clad switch gear is a vacuum operated breaker, although the invention is suitable for use with other types of drawout breakers used in metal clad switch gear.

The circuit breaker 1 has an auxiliary contact operating mechanism 7 which includes a shaft 9 extending laterally from the side of the circuit breaker. The auxiliary contact operating member 7 further includes a lever arm 11 having a sleeve 13 welded adjacent one end. The shaft 9 is received in a bore 15 extending through the sleeve 13 and the lever arm 11. The lever arm 11 is secured to the shaft 9 by press fit pins 17. At the free end 19 of the lever arm 11, a pin 21 is welded to extend parallel to the shaft 9. The end 23 of the pin 21 is turned down to form a shoulder 25. An elongated retainer member 27 has a transverse bore 29 adjacent one end 31 which is loosely rotatable on the turned down portion 23 of the pin 21. The bore 29 extends through a square base portion 33 on the elongated retainer member which bears against the shoulder 25.

Figure 3:
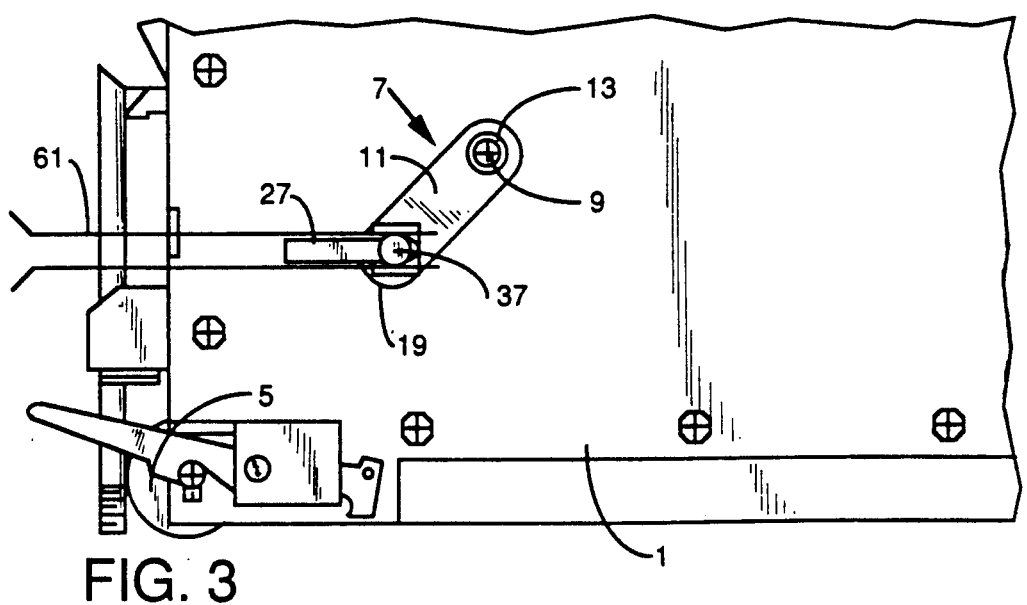
FIG. 3 is a view similar to that of FIG. 2 showing the circuit breaker installed in the cabinet and illustrating schematically the interconnection of the circuit breaker with a mechanism within the cabinet for operating cabinet mounted auxiliary contacts.
Figure 4:
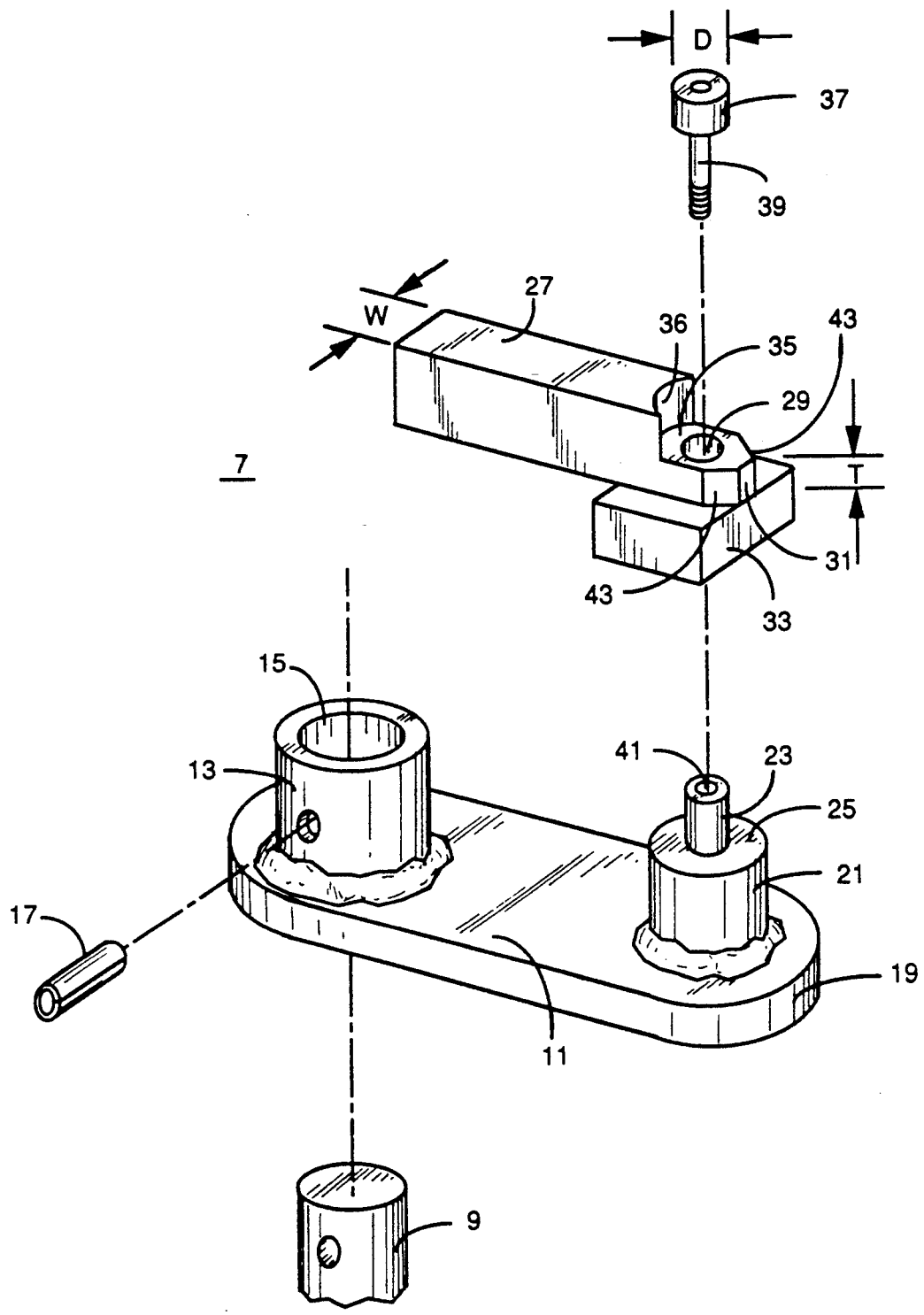
FIG. 4 is an exploded isometric view of the auxiliary contact operating member mounted on the circuit breaker and incorporating the retaining member in accordance with the invention.

The thickness, T, at of the one end 31 of the elongated retainer member 27 is reduced to form a recess 35. A follower roller 37 is received the recess 35 and has a shaft 39 which passes through bore 29 in the elongated retainer member 27 and is threaded into a bore 41 in the end of the pin 25. Thus, the follower roller 37 pivotally secures the elongated retainer member 27 to the pin 21. The rear wall of 36 of the recess 35 is curved at a radius only slightly greater than the radius of the follower roller 37 to minimize the clearance and prevent debris from becoming lodged within the clearance. The one end 31 of the elongated retainer member 27 is chamfered at 43. As can be seen from FIG. 1, the follower roller 37 extends axially beyond the elongated retainer member 27. It is also larger in diameter D than the width W of the elongated retainer member as can be seen from FIGS. 2–4.

Figure 2:
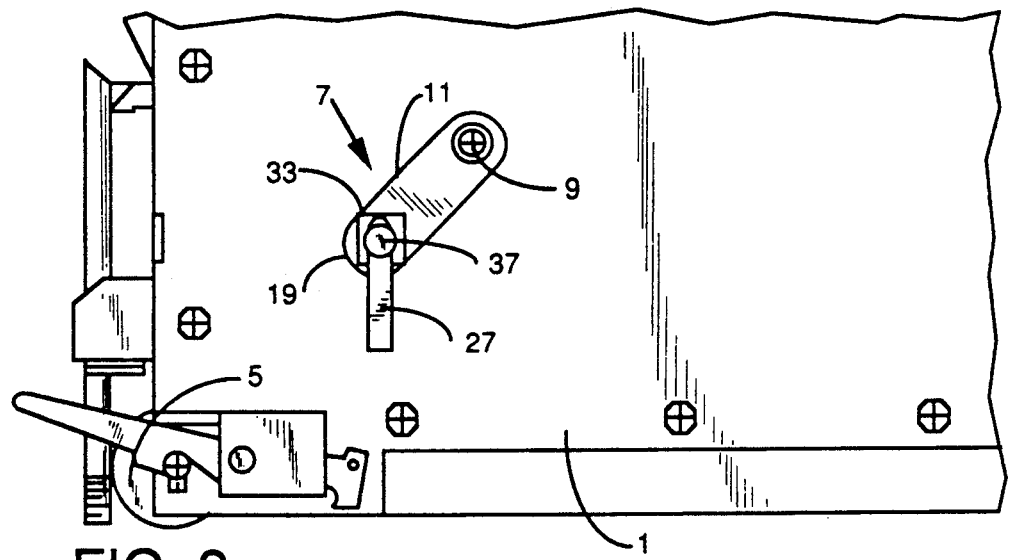
FIG. 2 is a side view of a portion of the circuit breaker of FIG. 1 illustrating the circuit breaker removed from the cabinet.

As shown in FIG. 2, when the circuit breaker 1 is removed from the cabinet and the circuit breaker is open, the shaft 9 is positioned such that the lever arm 11 extends downward and forward at an angle of about 45°, and the elongated retainer member 27 hangs vertically downward from the pin 21.

Figure 5:
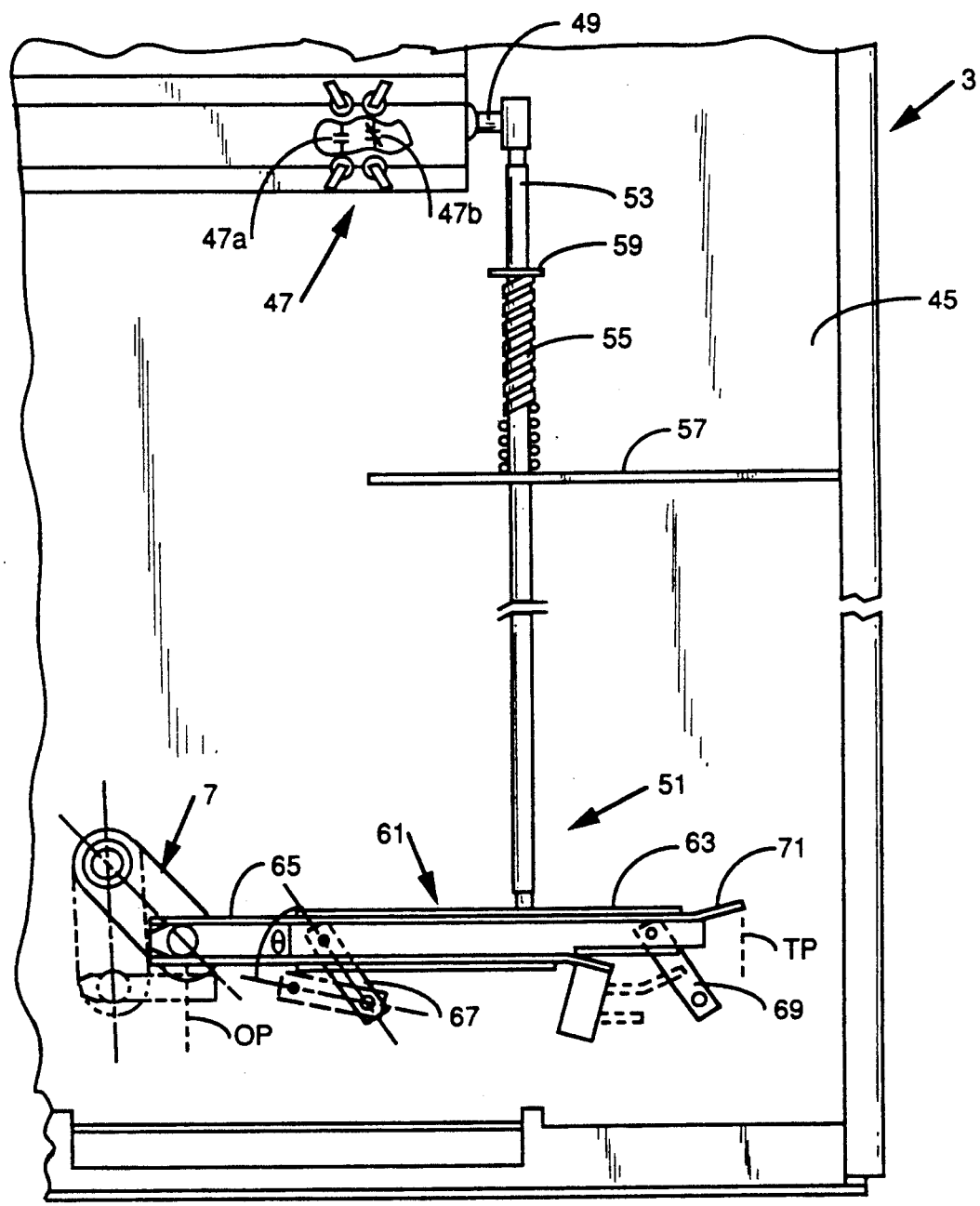
FIG. 5 is a schematic view illustrating the auxiliary contact mechanism mounted within the cabinet of the metal clad switch gear.

As mentioned, the auxiliary contact operating member 7 operates contacts mounted within the cabinet. FIG. 5 illustrates, partially schematically, the side wall 45 of the cabinet 3 which confronts the auxiliary contact operating member 7 on the circuit breaker.

U.S. Pat. No. 4,176,262 describes the mechanisms mounted within the cabinet in detail. Briefly, these mechanisms include one or more auxiliary switches 47 which may have, for instance, normally open contacts 47a and normally closed contacts 47b. The switch 47 is actuated by an actuating lever 49. A motion transfer assembly 51 includes a rod 53 connected at its upper end to the actuating lever 49 and is biased in the upward direction by a compression spring 55 which bears against a ledge 57 on the sidewall 45 and a flange 59 on the rod 53. The lower end of the rod 53 is pivotally secured to a channel assembly 61 which includes an outer channel 63 and an inner channel 65. The ends of the outer channel 63 are pivotally connected to pivot arms 67 and 69 which in turn are pivotally connected to the sidewall 45 to form a pantograph which maintains the channel assembly 61 horizontal as it is pivoted by the pivot arms. The inner channel 65 is slidably connected inside the outer channel 63 and has a flared forward end 71 for guiding the auxiliary contact operating device 7 into the channel assembly 61.

As described more fully in U.S. Pat. No. 4,176,262, the circuit breaker can have two positions within the cabinet 3. In the operating position, the circuit breaker is levered fully into the cabinet and engages terminals (not shown) in the rear of the cabinet which connect the circuit breaker to the protected circuit and to the line conductors. The circuit breaker can also be partially withdrawn to a test position in which the circuit breaker is disconnected from the protected circuit and the line conductors. With the circuit breaker in the operating position, the auxiliary contact operating member 7 is at the position labeled OP, near the rear end of the channel assembly 61. When the circuit breaker is closed, the auxiliary contact operating member rotates through the angle $\theta$ thereby pulling the channel assembly 61 downward which, through the rod 53, moves the actuating lever 49 downward to actuate the auxiliary switch 47. Due to the rapid operation of the vacuum circuit breaker 1, it is possible for the pin of the prior art auxiliary contact operating member to come out of the channel assembly 61. The elongated retainer member 27 which is incorporated into the auxiliary contact operating member 7 of the present invention prevents this from occurring, and therefore, assures reliable operation of the auxiliary contacts 47.

When the circuit breaker 1 is withdrawn to the test position, the auxiliary contact operating member 7 assumes the position identified as TP in FIG. 5. The channel assembly described in U.S. Pat. No. 4,176,262 provides for selectively having the auxiliary contacts operated or not operated when the circuit breaker is in the test position. If it is desired that the auxiliary contacts be operated with the circuit breaker in the test position, the inner channel 65 is extended from the outer channel 63 so that the auxiliary contact operating member 7 is captured in the channel assembly. If the auxiliary contacts are not to be operated when the circuit breaker is in the test position, the inner channel 65 remains retracted.

The elongated retainer member 27 of the invention not only provides additional contact between the auxiliary contact operating member 7 and the channel assembly 61, but also, it is made of steel and, therefore, has a mass sufficient to restrain the acceleration of the motion transfer assembly 51 which also contributes to providing reliable operation of the auxiliary contacts. The base portion 33 on the elongated retainer member 27, in addition to properly spacing the elongated member and follower roller 37 for engagement with the channel assembly 61, also contributes to the mass of the elongated retainer member 27.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A circuit interrupter apparatus comprising:
   a cabinet;
   a main circuit breaker movable into said cabinet and having an external auxiliary switch operating member movable between a closed position when said main circuit breaker is closed and an open position when said main circuit breaker is open;

auxiliary switch means mounted within said cabinet and having a contact actuating member;

motion transfer means movably mounted in said cabinet and interconnected with said auxiliary switch actuating member, said motion transfer means including a channel in which said auxiliary switch operating member is received as said main circuit breaker moves into said cabinet, said motion transfer means translating movement of said auxiliary switch operating member between said open and closed positions into actuation of said contact actuating member; and retainer means comprising an elongated retainer member mounted to said auxiliary switch operating member and which extends along said channel with said auxiliary switch operating member received in said channel.

2. The apparatus of claim 1 wherein said elongated retainer member has a mass sufficient to restrain acceleration of said motion transfer means in response to movement of said auxiliary switch operating member.

3. A circuit interrupter apparatus comprising:
a cabinet;
a main circuit breaker movable into said cabinet and having an external auxiliary switch operating member movable between a closed position when said main circuit breaker is closed and an open position when said main circuit breaker is open;
auxiliary switch means mounted within said cabinet and having a contact actuating member;
motion transfer means movably mounted in said cabinet and interconnected with said auxiliary switch actuating member, said motion transfer means including a generally horizontally extending channel in which said auxiliary switch operating member is received as said main circuit breaker moves into said cabinet, said motion transfer means translating movement of said auxiliary switch operating member between said open and closed positions into actuation of said contact actuating member; and
retainer means comprising an elongated retainer member pivotally connected adjacent one end to said auxiliary switch operating member to extend vertically downward therefrom when said main circuit breaker is not in said cabinet, said elongated member being engaged by said channel and rotated into alignment therewith as said main circuit breaker is moved into said cabinet.

4. The apparatus of claim 3 wherein said one end of said elongated retainer member is contoured to lead said elongated retainer member into said channel.

5. A circuit interrupter apparatus comprising:
a cabinet;
a main circuit breaker movable into said cabinet and having an external auxiliary switch operating member movable between a closed position when said main circuit breaker is closed and an open position when said main circuit breaker is open, said auxiliary switch operating member comprising a shaft extending laterally from said main circuit breaker, a lever arm extending laterally from said shaft and rotated thereby, said lever arm having a free end, a pin extending from adjacent said free end of said lever arm generally parallel to said shaft, and a follower roller supported by said pin;
auxiliary switch means mounted within said cabinet and having a contact actuating member;
motion transfer means movably mounted in said cabinet and interconnected with said auxiliary switch actuating member, said motion transfer means including a channel in which said auxiliary switch operating member is received as said main circuit breaker moves into said cabinet, said motion transfer means translating movement of said auxiliary switch operating member between said open and closed positions into actuation of said contact actuating member; and
retainer means comprising an elongated retainer member pivotally mounted on said pin of said auxiliary switch operating member and which extends along said channel with said auxiliary switch operating member received in said channel.

6. The apparatus of claim 5 wherein said elongated member has a reduced thickness extending from said one end forming a recess in which said follower roller is rotatable mounted.

7. The apparatus of claim 6 wherein said recess formed in said elongated retainer member has an arcuate rear wall configured to receive said follower roller.

8. The apparatus of claim 7 wherein said follower roller has a diameter greater than a width of said elongated retainer member.

9. The apparatus of claim 8 wherein said follower roller extends axially beyond said elongated retainer member.

10. The apparatus of claim 9 wherein said elongated retainer member has an enlarged base through which said pin extends.

11. The apparatus of claim 10 wherein said pin has a reduced terminal portion on which said elongated retainer member is pivotally mounted and which forms a shoulder on which said enlarged base of said elongated retainer member seats.

12. The apparatus of claim 6 wherein said follower roller has a diameter which is greater than a width of said elongated retainer member.

13. The apparatus of claim 12 wherein said follower roller extends axially beyond said elongated retainer member.

14. The apparatus of claim 5 wherein said follower roller has a diameter greater than a width of said elongated retainer member.

* * * * *